A. C. JACKSON.
BRASS MELTING FURNACE.
APPLICATION FILED MAY 31, 1906.

907,603.

Patented Dec. 22, 1908.

Witnesses:
William H. Pryor.
Titus H. Lyons.

Inventor
Arthur C. Jackson.
by his Attorneys,

UNITED STATES PATENT OFFICE.

ARTHUR C. JACKSON, OF PHILADELPHIA, PENNSYLVANIA, ASSIGNOR TO MILLER LOCK CO., OF PHILADELPHIA, PENNSYLVANIA, A CORPORATION OF PENNSYLVANIA.

BRASS-MELTING FURNACE.

No. 907,603.

Specification of Letters Patent.

Patented Dec. 22, 1908.

Application filed May 31, 1906. Serial No. 319,627.

*To all whom it may concern:*

Be it known that I, ARTHUR C. JACKSON, a citizen of the United States, residing in Philadelphia, Pennsylvania, have invented certain Improvements in Brass-Melting Furnaces, of which the following is a specification.

The object of my invention is to so construct a crucible furnace for melting brass or other metals as to utilize the waste heat which is inseparable from the operation of an ordinary brass melting furnace when under forced draft. This object I attain in the following manner, reference being had to the accompanying drawings, in which:—

Figure 1:
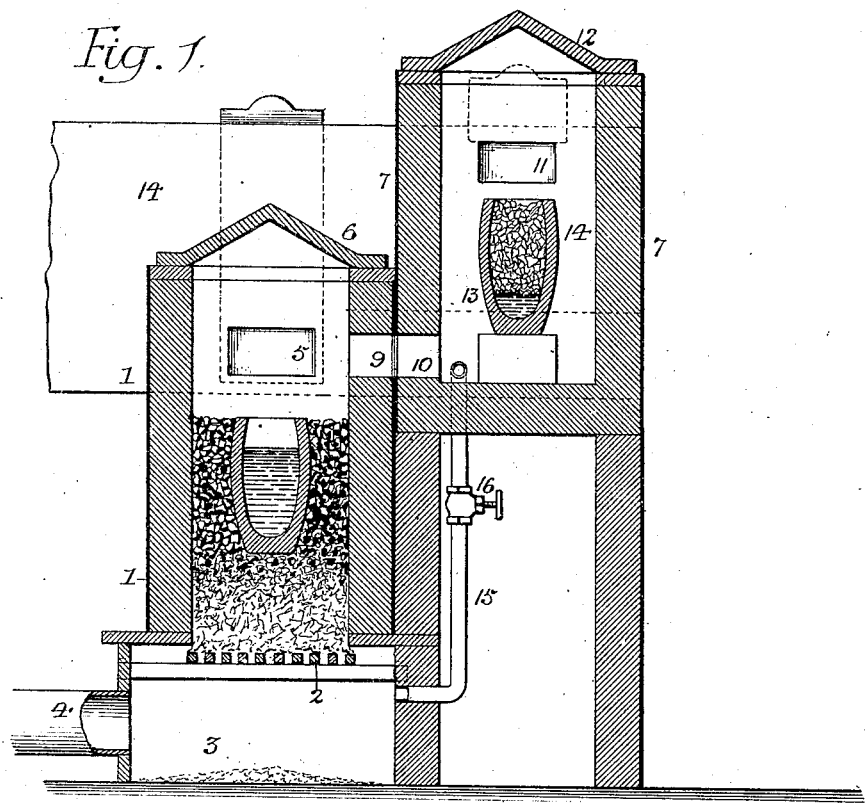
Figure 2:
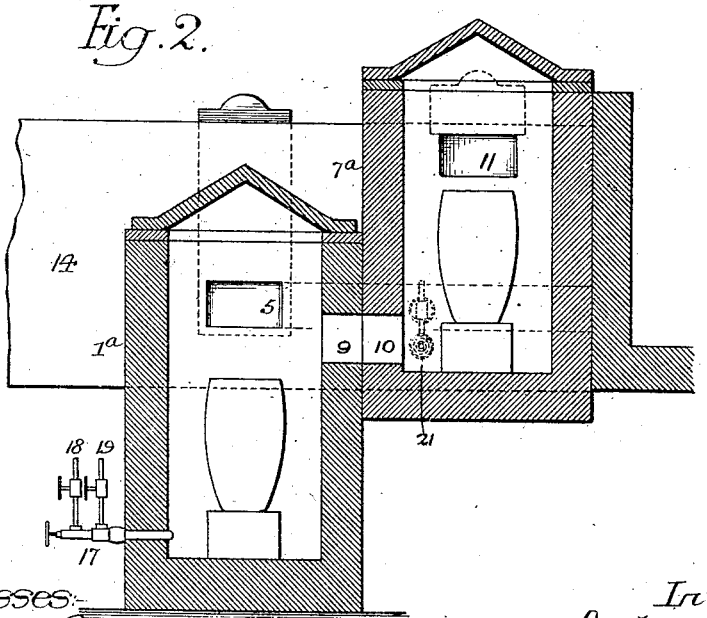

Figure 1, is a longitudinal vertical sectional view of a brass melting furnace constructed in accordance with my invention, using coal as a fuel; and Fig. 2, is a sectional view of a brass melting furnace in which gas or oil is used as the fuel.

Referring to Fig. 1, the primary melting furnace 1 is, as regards its general construction, similar to those now employed, said furnace having a grate 2 for the support of the fuel, an ash pit 3 with a supply pipe 4 for air under pressure, an outlet flue 5 for the products of combustion, and a cap 6 for closing the opening in the top of the furnace. The crucible, as shown in Fig. 1, in which the metal is to be melted, is embedded in the fuel as usual.

In carrying out my invention I mount a secondary furnace 7 alongside of and at a higher elevation than the furnace 1 and I provide said main furnace with a side flue 9 which communicates with a similar flue 10 at the bottom of the second furnace, the latter also having an outlet flue 11 and a cap 12 of any suitable construction.

Both the flues 5 and 11 communicate with the stack 14 and each flue should be provided with a damper as shown. When the damper in the flue 5 is closed the products of combustion are compelled to pass through the flues 9 and 10 and into the combustion chamber 13 of the secondary furnace 7 from which they escape through the outlet flue 11, thereby heating the contents of the secondary crucible which is suitably mounted in the combustion chamber 13.

A pipe 15 having a valve 16 serves as a communication between the ash pit 3 and the combustion chamber 13 and when the furnace is in operation the pipe furnishes a constant supply of air to said combustion chamber in order to ignite any of the gases entering said chamber which require an additional supply of oxygen in order to effect their proper combustion. The amount of air admitted from the ash pit 3 may be regulated by the valve 16, so that the supply of air to the secondary combustion chamber 13 is preserved at all times in the proper relation to the main supply in the ash pit.

When it is desired to permit the products of combustion to escape directly from the main furnace, as for instance in starting the fire, or at other times, the damper in the flue 5 can be opened and that in the flue 11 closed, thereby permitting the products of combustion to pass directly through the flue 5 to the stack.

In Fig. 2, I have shown a furnace in which gas or oil is used in place of coal. In this instance the primary furnace 1ª is connected to the secondary furnace 7ª in a manner similar to that shown in Fig. 1; but a burner 17 is used connecting with the air pipe 19 and the gas or oil pipe 18; the crucible in the primary furnace is mounted on a block, as is also the crucible in the secondary furnace 7ª. I may introduce gas or oil in the secondary furnace 7ª through a burner 21 which may be made similar to the burner 17, if an extra supply of fuel is required. The primary furnace 1ª has a flue 5 and the secondary furnace 7ª has a flue 11 and the connecting flues 9 and 11 are similar to those illustrated in Fig. 1.

After the furnace is in operation a crucible is placed in the secondary furnace and the metal allowed to melt in this crucible, fresh metal being added to it as the other melts. As soon as the crucible in the primary furnace is removed for the purpose of pouring, the crucible in the secondary furnace is transferred to the primary furnace, where it is brought to the proper pouring temperature. As soon as the first crucible has been emptied and while it is still hot it is placed in the secondary furnace and the scrap brass or other metal placed in it and the crucible refilled as the metal melts until it is fully charged with the molten mass of metal, when the crucible is transferred as above noted. The same operation takes place when gas or oil is used.

I claim:—

1. The combination in a crucible furnace in which the products of combustion always travel in the same direction, of a primary melting chamber, a secondary chamber located at one side of and at a higher level than the primary melting chamber, the furnace having a straight valveless passage extending directly from the upper portion of the primary melting chamber to the lower portion of the secondary chamber, and a stack communicating directly with both chambers.

2. The combination in a crucible furnace in which the products of combustion always travel in the same direction, having a primary chamber, a secondary chamber located at one side of and at a higher level than the primary chamber, said furnace having a direct passage connecting the upper end of the primary chamber with the lower end of the secondary chamber, an ash pit under the primary chamber, an air supply pipe communicating with the ash pit, and a pipe leading from the ash pit to the lower portion of the secondary chamber, a stack, flues connecting each chamber with the stack, and a valve in each flue.

In testimony whereof, I have signed my name to this specification, in the presence of two subscribing witnesses.

ARTHUR C. JACKSON.

Witnesses:
  WILL. A. BARR,
  JOS. H. KLEIN.